US010851307B2

United States Patent
Desai et al.

(10) Patent No.: US 10,851,307 B2
(45) Date of Patent: Dec. 1, 2020

(54) SYSTEM AND METHOD FOR PYROLYSIS USING A LIQUID METAL CATALYST

(71) Applicant: Palo Alto Research Center Incorporated, Palo Alto, CA (US)

(72) Inventors: Divyaraj Desai, Sunnyvale, CA (US); Jessica Louis Baker Rivest, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 15/681,522

(22) Filed: Aug. 21, 2017

(65) Prior Publication Data

US 2019/0055173 A1    Feb. 21, 2019

(51) Int. Cl.

| | |
|---|---|
| *C10B 49/14* | (2006.01) |
| *B01J 10/00* | (2006.01) |
| *C01B 3/26* | (2006.01) |
| *C22C 9/00* | (2006.01) |
| *C22C 19/00* | (2006.01) |
| *C22C 38/00* | (2006.01) |

(Continued)

(52) U.S. Cl.
CPC ............ *C10B 49/14* (2013.01); *B01J 10/005* (2013.01); *B01J 23/825* (2013.01); *B01J 35/0006* (2013.01); *B01J 35/12* (2013.01); *C01B 3/26* (2013.01); *C01B 32/05* (2017.08); *C22C 9/00* (2013.01); *C22C 19/007* (2013.01); *C22C 38/00* (2013.01); *D01F 9/127* (2013.01); *C01B 32/158* (2017.08); *C01B 32/182* (2017.08); *C01B 32/20* (2017.08); *C01B 32/25* (2017.08); *C01B 2203/0277* (2013.01); *C01B 2203/1058* (2013.01); *C01B 2203/1076* (2013.01); *C09C 1/48* (2013.01)

(58) Field of Classification Search
None
See application file for complete search history.

(56) References Cited

U.S. PATENT DOCUMENTS

| | | |
|---|---|---|
| 1,107,926 A | 8/1914 | Frank |
| 1,418,385 A | 6/1922 | Masson |

(Continued)

FOREIGN PATENT DOCUMENTS

| | | |
|---|---|---|
| EP | 1462170 | 9/2004 |
| WO | 98/22385 | 5/1998 |
| WO | 03045841 | 6/2003 |

OTHER PUBLICATIONS

Sageman, "Surface tension of molten metal using the sessile drop method", Retrospective Theses and Dissertations, Iowa State University, 1972, pp. 1-107. (Year: 1972).*

(Continued)

*Primary Examiner* — Philip Y Louie (74) *Attorney, Agent, or Firm* — Fay Sharpe LLP (57) ABSTRACT

A process for decomposing a hydrocarbon-containing composition includes feeding the hydrocarbon-containing composition to a reactor containing a catalytically active molten metal or a catalytically active molten metal alloy, wherein the metal or alloy catalyzes a decomposition reaction of the hydrocarbon-containing composition into a hydrogen-rich gas phase and a solid carbon phase. The solid carbon phase is insoluble in the metal or alloy. The process may be a continuous process.

11 Claims, 5 Drawing Sheets

(51) Int. Cl.
  B01J 35/12 (2006.01)
  B01J 35/00 (2006.01)
  B01J 23/825 (2006.01)
  D01F 9/127 (2006.01)
  C01B 32/05 (2017.01)
  C01B 32/158 (2017.01)
  C01B 32/182 (2017.01)
  C01B 32/20 (2017.01)
  C01B 32/25 (2017.01)
  C09C 1/48 (2006.01)

(56) References Cited

U.S. PATENT DOCUMENTS

| | | | |
|---|---|---|---|
| 1,756,877 A | | 4/1930 | Paris, Jr. |
| 1,803,221 A | * | 4/1931 | Tyrer ................. C01B 3/24 422/236 |
| 2,760,847 A | | 8/1956 | Oblad et al. |
| 2,882,216 A | | 4/1959 | Viles |
| 3,156,734 A | | 11/1964 | Happel |
| 3,625,026 A | * | 12/1971 | Cocker ............... G01N 27/411 65/99.4 |
| 3,965,252 A | | 6/1976 | Kmecak et al. |
| 4,983,278 A | | 1/1991 | Cha et al. |
| 5,537,940 A | * | 7/1996 | Nagel ..................... C09K 5/12 110/346 |
| 6,110,239 A | | 8/2000 | Malone et al. |
| 6,350,289 B1 | | 2/2002 | Holcombe et al. |
| 6,653,005 B1 | | 11/2003 | Muradov |
| 6,663,681 B2 | | 12/2003 | Kindig et al. |
| 6,670,058 B2 | | 12/2003 | Muradov |
| 6,682,714 B2 | | 1/2004 | Kindig et al. |
| 6,685,754 B2 | | 2/2004 | Kindig et al. |
| 6,719,047 B2 | | 4/2004 | Fowler et al. |
| 7,052,661 B1 | * | 5/2006 | Malone ................ B01D 53/04 423/210 |
| 7,588,746 B1 | | 9/2009 | Muradov et al. |
| 8,034,321 B2 | | 10/2011 | Mauthner et al. |
| 2003/0072705 A1 | | 4/2003 | Kindig et al. |
| 2003/0130360 A1 | | 7/2003 | Kindig et al. |
| 2011/0088320 A1 | * | 4/2011 | Dietenberger ......... C10J 3/463 48/87 |
| 2011/0089377 A1 | * | 4/2011 | Bingham ............... B01J 10/005 252/373 |

OTHER PUBLICATIONS

A. Abanades et al., "Technological challenges for industrial development of hydrogen production based on methane cracking", Energy 46, 2012, pp. 359-363.

A. Abanades et al, "Thermal cracking of methane into Hydrogen for a CO2-free utilization of natural gas", International Journal of Hydrogen Energy 38, 2013, pp. 8491-8496.

Alberto Abanades et al, "Development of methane decarbonisation based on liquid metal technology for CO2-free production of hydrogen", International Journal of Hydrogen Energy 41, 2016, pp. 8159-8167.

James E. Funk, "Thermochemical hydrogen production: past and present", International Journal of Hydrogen Energy 26, 2001 pp. 185-190.

R. M. Navarro et al, "Hydrogen Production Reactions from Carbon Feedstocks: Fossil Fuels and Biomass", Chem. Rev., 2007, 107, pp. 3952-3991.

Brett Parkinson et al, "Techno-Economic Analysis of Methane Pyrolysis in Molten Metals: Decarbonizing Natural Gas", Chem. Eng. Technol., 2017, 40, No. 6, pp. 1022-1030.

Alejandro A. Munera Parra et al., "Molten metal capillary reactor for the high-temperature pyrolysis of methane", International Journal of Hydrogen Energy 42, 2017, pp. 13641-13648.

D. Paxman et al., "Initial experimental and theoretical investigation of solar molten media methane cracking for hydrogen production," Energy Procedia 49, 2014, pp. 2027-2036.

M. Plevan et al, "Thermal cracking of methane in a liquid metal bubble column reactor: Experiments and kinetic analysis", International Journal of Hydrogen Energy 40, 2015, pp. 8020-8033.

Sylvain Rodat et al, "Kinetic modelling of methane decomposition in a tubular solar reactor", Chemical Engineering Journal 146, 2009, pp. 120-127.

Sylvain Rodat et al, "Experimental Evaluation of Indirect Heating Tubular Reactors for Solar Methane Pyrolysis", International Journal of Chemical Reactor Engineering, vol. 8, 2010, Article A25, 22 pages.

M. Steinberg, "Fossil fuel decarbonization technology for mitigating global warming", International Journal of Hydrogen Energy 13, 1999, pp. 771-777.

European Patent Office, European Search Report in related application No. 18185524.8 (dated Jan. 15, 2019).

* cited by examiner

SYSTEM AND METHOD FOR PYROLYSIS USING A LIQUID METAL CATALYST

BACKGROUND

The U.S. and the broader international community continue to lack a scalable emission-free, energy-efficient, low-cost $H_2$ production technology. The promise of the $H_2$ economy for mitigating climate change hinges upon the rapid development of clean $H_2$ production, storage, delivery, and utilization. The global consumption of $H_2$ is estimated to be greater than 50 million tons per year (MT year$^{-1}$), and global $H_2$ sales are projected to reach \$152 billion year$^{-1}$ by 2021. $H_2$ production using fossil fuels remains the preferred method; however, this requires a staggering 11 quads of energy annually, with an estimated 550 million tons of emitted $CO_2$. In order to meet growing $H_2$ demand while simultaneously meeting climate goals, the need for scalable, cost-competitive, carbon-free $H_2$ production has never been greater.

The state of the art carbon-neutral $H_2$ production technologies that are available today remain uneconomical. While water electrolysis powered by renewable electricity has prohibitively high $H_2$ production costs, the predominant $H_2$ production processes, i.e., steam reforming (48%), partial oxidation (30%), and coal gasification (18%) all have exceptionally high $CO_2$ emissions (8-18 kg $CO_2$ per kg $H_2$). The addition of $CO_2$ capture technology drives up production costs far beyond current market appetites. Carbon-neutral and low water consumption processes for $H_2$ production are similarly uneconomical. For example, water electrolysis powered by renewable electricity has a prohibitively high production cost (greater than \$4 kg$^{-1}$ $H_2$).

Additionally, all of the above processes involve the energetically-expensive decomposition of water (63-143 kJ kg$^{-1}$ $H_2$). In steam reforming of methane, half of the hydrogen ($CH_4+2H_2O \rightarrow CO_2+4H_2$) is produced by breaking the strong O—H bond. Consequently, all of the current approaches involve either the use of fuel or electricity to cleave the O—H bond.

An alternative is to produce hydrogen through decomposition (pyrolysis) of hydrocarbons without oxidizing the carbon atoms. The pyrolytic decomposition of methane has been discussed for the generation of hydrogen from natural gas and for avoiding the cogeneration of $CO_2$. Such a route is presented as an alternative to the methane steam reforming (MSR) process and was initially achieved using a supported metal catalyst or thermolytic decomposition. Existing literature describes the use of alumina-supported transitional metal catalysts (Ni, Cu, Co, Fe) to accelerate the decomposition of methane at temperatures as low as 525° C. While the use of catalysts reduces the activation barrier, the catalyst surface is rapidly coked by an inseparable carbon layer which slows the reaction rate. Ultimately, the catalysts are deactivated as a result of carbon buildup on the catalyst site, or coking. Furthermore, the thermal decomposition of methane necessitates very high temperatures in excess of 1500° C., due to slow hydrocarbon decomposition on carbon. Examples of this include the Kvaerner process to produce carbon black and hydrogen which is associated with a higher capital cost.

Molten metals have been explored as media for natural gas decomposition but suffer from poor decomposition kinetics even at high operating temperatures (1000° C.), rendering this opportunity economically unfeasible.

In recent years, there has been published work on the use of liquid metals for the separation of the carbon phase. However, the use of liquid metals that have been reported (Sn, Pb, Bi) are not particularly catalytically active for methane decomposition, meaning that the reactor gas hourly space velocity (GHSV) is low, necessitating large reactors associated with a higher capital cost. Additionally, some liquid metals, such as Pb and Hg, are associated with a greater risk of environmental pollution.

Similarly, the production of synthetic carbon products such as carbon fibers, carbon nanotubes, carbon black, charcoal, coke, graphite, and/or graphene is important. It would be desirable to develop new methods for producing different forms of elemental carbon through the pyrolysis of natural gas or other hydrocarbons. The current and near-term outlook of the carbon market is summarized in the table below.

| | Global demand (MT year$^{-1}$) | Reference |
|---|---|---|
| Hydrogen | >50 | https://www.hydrogen.energy.gov/pdfs/hpep_report_2013.pdf |
| Coke | 651 | https://www.statista.com/statistics/267891/global-coke-production-since-1993/ |
| Graphite | 1.2 | http://www.csaglobal.com/wp-content/uploads/2016/03/Paydirt-Media-14-March-2016.pdf |
| Carbon black | >15 (projected) | http://www.ceresana.com/en/market-studies/chemicals/carbon-black/ |
| Carbon fiber | 0.2 (projected) | http://www.grandviewresearch.com/industry-analysis/carbon-fiber-market-analysis |
| CNT | 0.013 | http://www.nanowerk.com/spotlight/spotid=23118.php |

BRIEF DESCRIPTION

The present disclosure relates to systems and methods for decomposing hydrocarbons into a hydrogen-rich gas phase and a carbon phase.

Disclosed, in some embodiments, is a process (e.g., a continuous process) for decomposing a hydrocarbon-containing composition which includes feeding the hydrocarbon-containing composition to a reactor containing a catalytically active molten metal or a catalytically active molten metal alloy, wherein the metal or alloy catalyzes a decomposition reaction of the hydrocarbon-containing composition into a hydrogen-rich gas phase and a solid carbon phase. The carbon phase is minimally soluble in the metal or alloy.

The reactor may be operated at a temperature of less than 1000° C., including less than 800° C.; and the process may achieve a conversion efficiency of greater than 50%.

In some embodiments, the reactor is a bubble column reactor. The bubble column reactor may have a height to diameter ratio of less than 3:1. A bubble column reactor is a reactor designed to generate and control gas-liquid reactions. The bubble column reactor may include a vertically-oriented cylindrical column. The column may be fully or partially filled with a liquid. Gas can be introduced via a sparger. The sparger may be horizontally oriented or vertically oriented. When vertically oriented, the sparger may be introduced into the reactor vessel via the top or via the bottom. In some embodiments, multiple sparger elements are included.

The reactor may be a shallow film reactor. The shallow film reactor may have a molten metal depth of less than 1 meter.

In some embodiments, the reactor is a slurry reactor.

In some embodiments, the carbon phase forms a floating slag in the reactor; and the process further includes removing (e.g., continuously removing) the floating slag.

The reactor may be connected to a gravity settler.

In some embodiments, the reactor is connected to a cyclone separator.

The carbon phase may include carbon fibers, graphene, diamond, glassy carbon, high-purity graphite, carbon nanotubes, carbon black, coke, or activated charcoal.

In some embodiments, the alloy comprises at least one catalyst element selected from the group consisting of nickel, iron, copper, zinc, and palladium.

The alloy may include at least one carrier element selected from the group consisting of gallium, tin, zinc, and bismuth. One or more elements may be included to either improve the solubility of the catalyst metal or to reduce the melting point of the alloy. Non-limiting examples of these elements include indium, zinc, aluminum, and tin. The addition of these phases may lead to the formation of binary, ternary, quaternary, or other multicomponent alloys. In some embodiments, these alloys is that they would all have a melting point less than 800° C.

In some embodiments, the alloy is a nickel-gallium alloy, a copper-gallium alloy, or a copper-nickel-tin alloy.

The alloy may be a nickel-gallium alloy, a copper-gallium alloy, an iron-gallium alloy, or any combination thereof.

In some embodiments, the alloy is a copper-tin alloy, a nickel-tin alloy, or any combination thereof.

The catalytically active phase may be molten zinc metal.

In some embodiments, the metal or alloy has a melting point of less than 800° C.

The hydrocarbon-containing composition may be fed to the reactor through a porous diffuser (e.g., a nanoporous membrane).

In some embodiments, the porous diffuser is used to produce bubbles that have an average diameter in the range of from about 100 nm to about 10 mm. Non-limiting examples of materials used in the porous diffuser may include ceramics such as glass, silica, alumina, zirconia; or metals such as tungsten, and tantalum. The material of the diffuser may exhibit immiscibility with the molten metal at the operating temperature and a high boiling point.

In some embodiments, the porous diffuser may be used to produce bubbles with an average diameter in the range of from about 100 nm to about 10 mm.

The hydrocarbon-containing composition may be selected from the group consisting of natural gas, liquefied petroleum gas, naphtha, light crude oil, heavy crude oil, oil sands, shale oil, wood, biomass, and other organic waste streams.

In some embodiments, the hydrocarbon-containing composition is selected from the group consisting of straight or branched chain alkanes, alkenes, alkynes, arenes, or any combination thereof with a chain length of $C_1$ to $C_{20}$.

Disclosed, in other embodiments, is a process (e.g., a continuous process) for decomposing a hydrocarbon-containing composition which includes feeding the hydrocarbon-containing composition to a reactor containing a catalytically active molten metal or a catalytically active molten metal alloy, wherein the metal or alloy catalyzes a decomposition reaction of the hydrocarbon-containing composition into a hydrogen-rich gas phase and a solid carbon phase; and controlling an interfacial tension within the reactor by maintaining a dynamic equilibrium of oxide to optimize bubble surface area. The carbon phase is minimally soluble in the metal or alloy.

In some embodiments, the interfacial tension is controlled by maintaining a selected degree of oxidation of the molten metal using at least one of the following: (i) applying an electric field between a reactor wall of the reactor and the metal or alloy; (ii) doping the hydrocarbon-containing composition with an oxidant; and (iii) adding a solid oxidizing agent to the metal or alloy. Non-limiting examples of such oxides include metal or multi-metal oxides chosen from the elements in the periodic table.

When the electric field is applied, the reactor may be lined with an oxide ion donor.

In some embodiments, the oxide ion donor includes at least one material selected from the group consisting of yttria, zirconia, ceria, scandia, and gadolinia.

When the hydrocarbon-containing composition is doped with the oxidant, the oxidant can be oxygen and/or ozone.

Disclosed in further embodiments is a system for decomposing (e.g., continuously decomposing) a hydrocarbon. The system includes a reactor having an internal volume for holding a catalytically active molten metal or a catalytically active molten metal alloy; a member for delivering the hydrocarbon to the internal volume; and an outlet for recovering a hydrogen-rich gas phase. The system further includes a device for recovering a solid carbon phase. The device may be fluidly connected to the reactor via a first conduit and a second conduit.

The reactor may be a bubble column reactor (optionally with a height to diameter ratio of less than 3:1), a shallow film reactor (optionally with a molten metal depth of less than 1 meter), or a slurry reactor.

In some embodiments, the reactor contains the catalytically active molten metal alloy and the alloy is a nickel-gallium alloy, a copper-gallium alloy, an iron-gallium alloy, or any combination thereof.

The reactor may contain the catalytically active molten metal alloy wherein the alloy is a copper-tin alloy, a nickel-tin alloy, or any combination thereof.

In some embodiments, the reactor contains the catalytically active molten metal and the metal is zinc.

The hydrocarbon-containing composition may be selected from the group consisting of natural gas, liquefied petroleum gas, naphtha, light crude oil, heavy crude oil, oil sands, shale oil, wood, biomass, and other organic waste streams.

In some embodiments, the hydrocarbon-containing composition is selected from the group consisting of straight or branched chain alkanes, alkenes, alkynes, arenes, or any combination thereof with a chain length of $C_1$ to $C_{20}$.

The system may further include a high aspect ratio structure within the reactor upon which gas can attach to optimize bubble size and/or to seed carbon deposition for efficient removal. The structure may be a string or wire that can be pulled through the molten metal to serve as a bubble guide. In some embodiments, the structure comprises silicon carbide, alumina, or quartz. The structure may be a vertical wire and may ensure elongated bubble shape and higher surface area, while also preventing premature bubble coalescence. This structure may be pulled out continuously to harvest solid carbon product (spool-to-spool wire wrapping with carbon removal system between spools) or may be removed and harvested intermittently.

In some embodiments, the reactor is lined with an oxidant donor.

The system may further include a porous diffuser for controlling gas stream diameter.

In some embodiments, the interfacial area is controlled using a porous separator material made of sintered particles. The particles may be selected from alumina, silicon carbide, yttria, scandia, gadolinia, zirconia, ceria, titania, magnesia, and silica.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the compositions, systems, and methods disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients or steps and permit the presence of other ingredients or steps. However, such description should be construed as also describing compositions, mixtures, or processes as "consisting of" and "consisting essentially of" the enumerated ingredients or steps, which allows the presence of only the named ingredients or steps, along with any impurities that might result therefrom, and excludes other ingredients or steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, the term "minimally soluble" encompasses insolubility and very low levels of solubility. In some embodiments, the solubility is less than 20 g/L, including less than 15 g/L, less than 10 g/L, less than 8 g/L, less than 5 g/L, less than 3 g/L, and less than 1 g/L.

A process for hydrocarbon pyrolysis in a liquid metal alloy includes catalytically decomposing it into a mixture of hydrogen-rich gas phase and a carbon phase. The process may be a continuous process of a batch process.

In some embodiments, a hydrogen-rich hydrocarbon feed is catalytically decomposed into a mixture of lower chain hydrocarbons. The hydrogen generated during decomposition may be used in situ for the further cracking of carbon-hydrogen bonds. This method may be used to crack crude oil to produce lower chain hydrocarbons. The distribution of reaction products depends on the reactor operating conditions. The operating conditions can be varied to obtain a more favorable yield of a particular hydrocarbon phase.

The alloy may include at least one catalyst element and at least one carrier element. The catalyst element may be nickel, iron, copper, and/or palladium. The carrier element may be gallium, tin, and/or bismuth. In some embodiments, the carrier element is gallium or tin and the catalyst element is nickel in an amount of from a trace amount to about 20 wt %. In some embodiments, the carrier element is gallium and the catalyst element is iron in an amount of from a trace amount to about 15 wt %. In some embodiments, the carrier element is gallium and/or tin and the catalyst element is copper in an amount of from a trace amount to about 60 wt %. In some embodiments, the molten and catalyst elements might be the same. Non-limiting examples of such a phase include zinc, nickel, or copper operating at a temperature in excess of their melting point.

In some embodiments, the catalytically active liquid metal alloy includes active material loading up to 10% (Ni—Ga alloy) and 40% (Cu—Ga alloy). During operation, hydrocarbon is sparged into a pyrolytic reactor operating at about 600 to 1000° C., including about 800° C. The use of a liquid metal addresses the problem of coking observed in solid catalysts. Since the solid carbon phase is insoluble in the liquid metal or alloy, it readily separates out and can be removed in the form of a floating slag. The continual removal of the carbon phase ensures extended operations without catalyst deactivation.

The alloy composition may further include a solvent component. The catalytic component may be highly soluble in the solvent. Selective non-limiting examples of this may be use of bismuth, indium, or tin to form a ternary, quaternary, or multi-element alloy with a melting point less than 800° C. Non-limiting examples of solvent components include the metals indium, bismuth, and tin.

The alloy composition may further include a component for reducing the melting temperature of the alloy and/or forming a eutectic. The melting temperature may be less than 1,000° C., including less than 900° C., less than 850° C., and less than 800° C.

The foaming properties of the alloy may be controlled to achieve a high void fraction of the gas phase while ensuring maximal gas-molten metal contact. This may be achieved by controlling the rheological properties such as viscosity and non-Newtonian behavior such as shear thickening. Approaches to achieve this include adjusting the concentration of dissolved phase within the molten metal to achieve an appropriately high viscosity necessary to produce a metal foam. In some embodiments, the dissolved phase may be a catalyst phase. In some embodiments the bubble diameter and bubble pressure may be controlled using a porous diffuser and flow controller to achieve an adequate shear rate sufficient to modulate the shear-thickening properties of the molten metal.

Optionally, the surface tension of the liquid metal is reduced by doping with a small amount of an oxidant (e.g., oxygen or ozone). This results in an increase in the interfacial surface area, ensuring a high turnover frequency for the catalyst.

Figure 1:
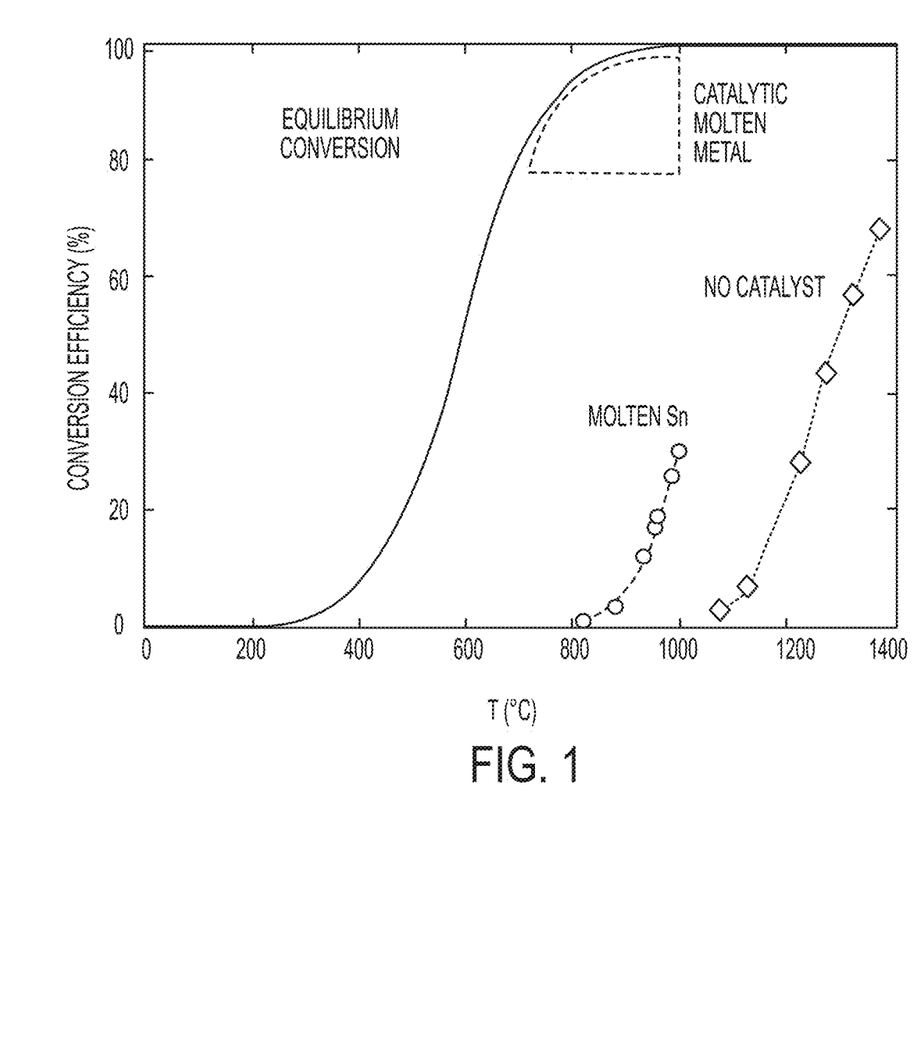
FIG. 1 is a graph showing conversion efficiency (%) as a function of temperature (° C.) for a pyrolytic decomposition method using a nickel-gallium eutectic alloy in accordance with some embodiments of the present disclosure in comparison to reported experimental data for molten tin, non-catalytic and equilibrium processes.

The molten metal and system design may improve hydrocarbon conversion to near-equilibrium values by using catalytically-active eutectic metal alloys. This approach addresses the limitations of current pyrolysis processes: coking of supported catalysts and poor catalytic activity of non-transition molten metals. Carbon's low solubility in most molten metals and lower density enables its removal in the form of a floating slag. Low-melting eutectics of known hydrocarbon decomposition catalysts (Mn, Co, Cu, Zn, Ni, Fe) improve the catalytic activity, and a single-pass conversion of 90% at 800° C. is expected, which approaches the thermodynamic limit for methane pyrolysis. FIG. 1 is a graph showing conversion efficiency (%) as a function of temperature (° C.) for a pyrolytic decomposition method using a nickel-gallium eutectic alloy in accordance with some embodiments of the present disclosure in comparison to reported experimental data for molten tin, non-catalytic and equilibrium processes.

The specific catalyst area can be enhanced by reducing the hydrocarbon bubble diameter using two approaches. In some embodiments, this is achieved by using a porous diffuser (e.g., a nanoporous membrane) to constrain bubble size, and/or controlling of interfacial tension by maintaining a dynamic-equilibrium of metal oxide by the application of an applied electric field or by the addition of a small amount of oxidant (e.g., $O_2$) to the incoming feed stream.

The porous diffuser may be used to produce bubbles with diameter in the range of from about 100 nm to about 10 mm. In some embodiments, the diffuser is an anodized alumina porous membrane. The average bubble size may be greater than 100 nm, greater than 1 µm, greater than 10 µm, greater than 100 µm, or greater than 1 mm.

The porous diffuser may have an average pore size in the range of from about 20 nm to about 1 mm. In some embodiments, the diffuser is an anodized alumina porous membrane. The average pore size may be greater than 30 nm, greater than 50 nm, greater than 75 nm, greater than 100 nm, or greater than 200 nm. In some embodiments, the average pore size is less than 8 µm, including less than 50 nm, less than 100 nm, less than 1 µm, less than 10 µm, less than 100 µm, and less than 1000 µm.

For the case with an applied electric field, the reaction vessel may be lined with a layer of an oxide ion donor. Non-limiting examples of oxide ion donors include yttria, zirconia, ceria, scandia, gadolinia, and mixtures thereof. The reactor wall acts as an oxide ion donor, and a small electric field is applied between the reactor wall and the molten metal pool. This causes a small amount of oxide ion present in the liner to migrate into the liquid metal, which is adequate to lower the interfacial tension. The liner can be regenerated by reversal of polarity of the applied electric field, in the presence of a small amount of oxide dopant in the feed gas.

The oxide dopant may be added either continuously or periodically.

The technology represents a revolutionary process for efficiently converting hydrocarbons into $H_2$ gas and solid carbon with pyrolytic reformation. If all $H_2$ production in the U.S. is supplied by this process (15 MT year$^{-1}$ in 2020), then annual savings of 1 quad of energy and 160 MT $CO_2$ emissions would be achieved. While accomplishing this level of energy savings and emissions reductions would require historic rates of adoption, the projected cost of $1.02 kg$^{-1}$ $H_2$ or less make such a scenario plausible. Furthermore, the baseline cost, even assuming zero carbon revenue or tax credits, is much lower than water electrolysis using renewables, and is competitive with traditional steam methane reforming. The residual carbon product (45 MT year$^{-1}$ in 2020) may have value either as coke (88 MT year$^{-1}$ produced in US), or may supply the entire global markets for carbon black and graphite (25 and 20 MT year$^{-1}$ respectively), further improving $H_2$ economics.

Additionally, the process may enable net negative emissions through simultaneous biochar and energy production from agricultural waste.

Figure 2:
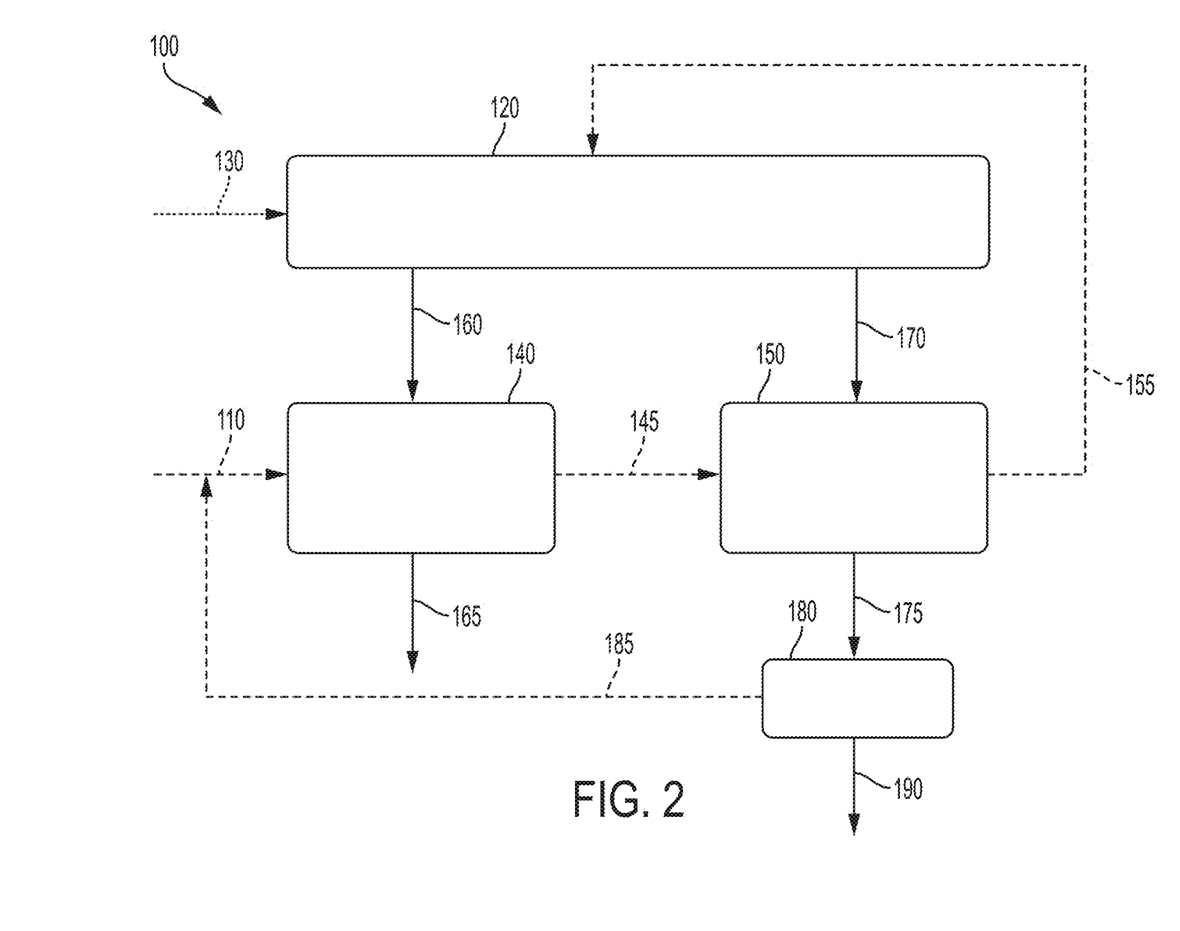
FIG. 2 is a process flow diagram illustrating an exemplary hydrocarbon decomposition method to produce $H_2$ and solid carbon in accordance with some embodiments of the present disclosure.

A non-limiting example of a system and method 100 for $H_2$ production is shown in FIG. 2. While natural gas is the typical feedstock, the process is capable of handling longer chain hydrocarbons as well. A hydrocarbon feed 110 is continually injected into a reactor 120 (e.g., a molten metal bubble column reactor) where C—H bonds are catalytically cracked. The reactor temperature (e.g., 600-1000° C.) may be maintained by combustion of a small portion (<2%) of natural gas. The temperature can also be maintained via a temperature control system 130 (e.g., a reactor). Hydrogen 170 produced during the reaction exits the top of the reactor 120 and is used to preheat the feed gas 145 at a first heat exchanger 150. Preheated hydrocarbon gas 155 is provided to the reactor 120. A separator 180 (e.g., a pressure-swing adsorption unit) is used to separate hydrocarbon(s) 185 from the cooled gas 175, to yield high purity hydrogen 190 (e.g., greater than 99% purity). Use of higher hydrocarbons would allow the process to be operated at temperatures below 600° C., but with a reduced production rate. The carbon phase has poor solubility in the molten metal, and can be separated gravimetrically. The continuous removal of the carbon residue 160 ensures that the high catalytic activity of the molten metal is sustained for extended durations. The carbon residue 160 can be concentrated using a carbon removal system and periodically or continuously removed for further processing or sequestration. The hot carbon 160 can be used to heat the hydrocarbon feed gas 110 at a second heat exchanger 140. The carbon product 165 may be highly pure (e.g., greater than 99% pure).

ECONOMIC MODELING: Economic modeling was performed to assess the technology disclosed herein in comparison with existing technologies using existing methane-reforming cost models. The economic model assumes 90% hydrocarbon conversion in the process, including annual replacement of the molten metal.

The specific reactor cost of the dehydrogenation process is analogous to basic oxygen furnace steelmaking, with an assessed capital cost of less than $600 tpa$^{-1}$ H$_2$. One of the benefits of this process is the low capital cost relative to competing technologies. This is due in part to the higher space velocity achievable in a bubble column reactor and ambient pressure operation, as well as the absence of an expensive CO$_2$ capture system ($60 ton$^{-1}$ CO$_2$). No CO$_2$ credits are included in the cost models. The baseline hydrogen production cost is $1.13 kg$^{-1}$ H$_2$, which is competitive with existing technologies such as steam reforming ($1.18 kg$^{-1}$ H$_2$), and is dominated by amortized capital and methane feedstock. The process becomes intensely economical ($0.42 kg$^{-1}$ H$_2$) when revenue from the sale of carbon (greater than $0.10 kg$^{-1}$ carbon) is included, which could enable significant emissions reduction without affecting the H$_2$ production cost. The results of the economic modeling are summarized in the Table below.

| Technical Metric | Steam Reforming (State of the Art) | Coal Gasification (Conventional) | Present Application |
|---|---|---|---|
| Production Cost ($ kg$^{-1}$ H$_2$) | 1.18 | 2.10 | 1.13 (0.42 if C is sold |
| Specific Capital Cost ($ tpa$^{-1}$ H$_2$) | 1,200 | 4,400 | 600 |
| Specific CO$_2$ emissions (kg CO$_2$ per kg H$_2$) | 7.5 | 18 | ≤0.50 |
| Energy Efficiency (%) | 74 | 60 | 58 |
| GHSV (h$^{-1}$) | 3-30,000 | 2,000 (WGS) | >10,000 |
| Overall Reaction | CH$_4$ + 2H$_2$O -> CO$_2$ + 4H$_2$ | C + 2H$_2$O -> CO$_2$ + 2H$_2$ | CH$_4$ -> C + 2H$_2$ |

Figure 5:
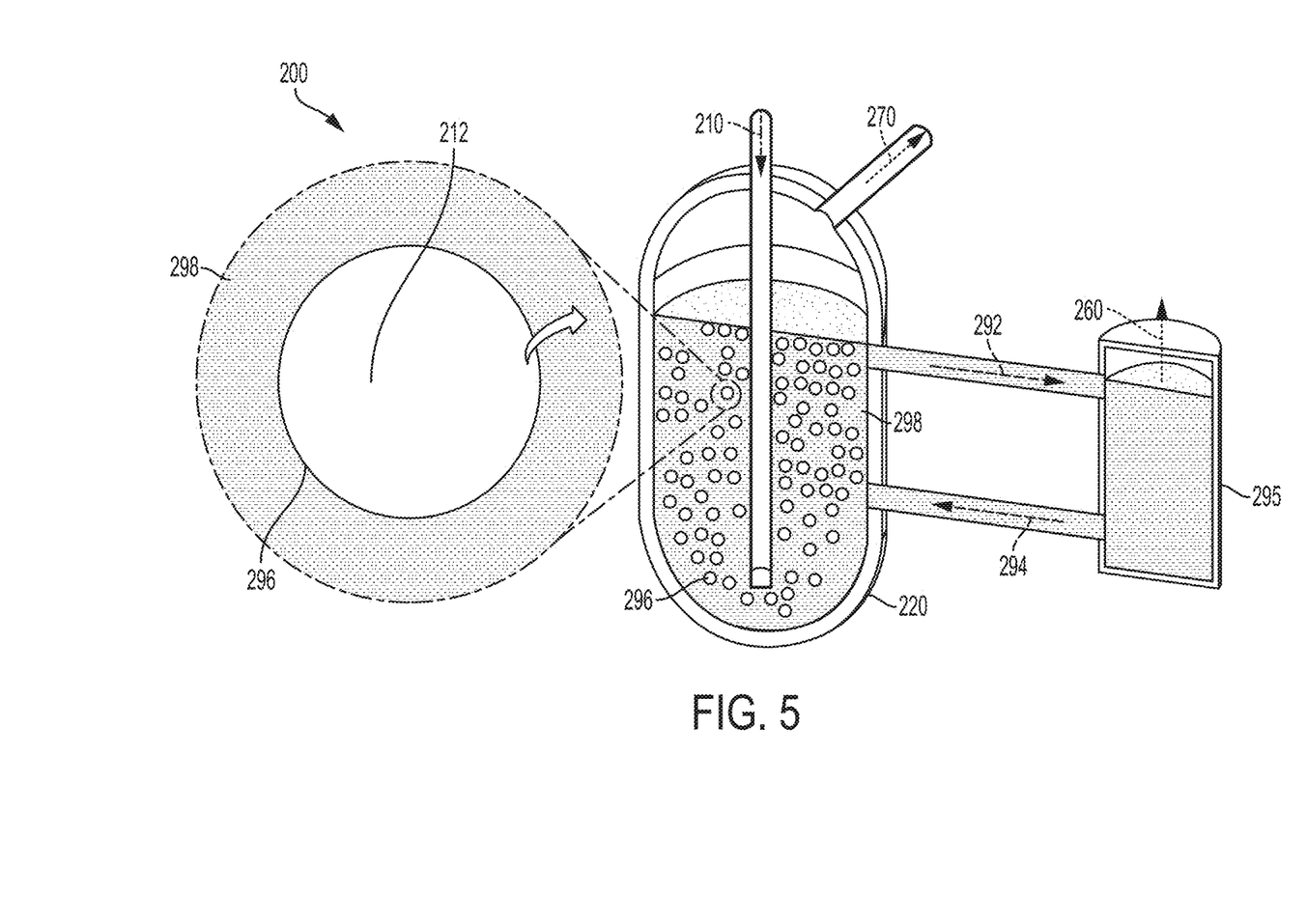
FIG. 5 schematically illustrates a hydrocarbon decomposition system in accordance with some embodiments of the present disclosure.

FIG. 5 schematically illustrates a hydrocarbon decomposition system 200 in accordance with some embodiments of the present disclosure. The system 200 includes a reactor 220 and a carbon settler 295. The reactor 220 and carbon settler 295 are fluidly connected via a first conduit 292 and a second conduit 294. These conduits 292, 294 allow for liquid metal recirculation. The reactor 220 contains a catalytic liquid alloy 298. Hydrocarbons are fed into the alloy 298 via hydrocarbon feed 210. The hydrocarbon gas 212 forms bubbles 296 in the catalytic alloy 298. A hydrogen-rich gas stream is recovered via outlet 270 and a carbon product is recovered via outlet 260.

Disclosed, in some embodiments, is a system and method for the continuous production of hydrogen and carbon. Optionally, the system includes a bubble column reactor with a gravity separator to ensure the continuous separation and removal of the carbon phase.

The reactor can be optimized (e.g., reactor sizing, liner materials and design of the feed sparger) depending on the desired products.

Optionally, the system further includes at least one internal structure upon which gas can attach. The structure may be a high aspect ratio structure. In some embodiments, the structure comprises silicon carbide, alumina, or quartz. The structure may be a vertical wire and may ensure elongated bubble shape and higher surface area. The aspect ratio of the structure may be greater than 3:1, including greater than 5:1, greater than 7:1, greater than 10:1, and greater than 20:1. The high aspect ratio structure could be continuously pulled through the molten metal to serve as a bubble guide (vertical wire ensures elongated bubble shape, higher surface area) and a component for harvesting solid carbon. In particular embodiments, the internal structure is a silicon carbide string or wire.

The carbon removal system may include a gravity settler (e.g., for heavy particles) and/or a cyclone separator (e.g., for lighter/entrained particles). The typical size of the heavy particles is determined from the largest carbon particle that would be neutrally buoyant in the gas space velocity. For the implementation in hydrocarbon pyrolysis, the carrier gas can be hydrogen at 800° C. (density 23 g L$^{-1}$). The drag or lift force exerted by the gas onto the particle is equated to the particle mass for neutrally buoyant masses. Assuming spherical particles, the typical particle size is 50 nm (1 cm s$^{-1}$), 5 μm (10 cm s$^{-1}$), and 500 μm (1 m s$^{-1}$). However, the precise particle size is determined by the carbon particle shape. In this particular scenario, particles under 1 μm would be considered lighter particles and those over 100 μm would be considered heavy particles.

In some embodiments, the interfacial tension of the liquid metal is controlled by doping the feed gas with an oxidant (e.g., O$_2$).

The oxidant may also be selected from one or more metal oxides or mixed metal oxides.

The alloy composition and operating conditions can be adjusted for the production of high-value carbon phases such as carbon fibers, graphene, battery-grade graphite, and/or CNTs.

In some embodiments, the carbon phase particles have an average aspect ratio in the range of from about 1 to about 500, including from about 1 to about 50, from about 2 to about 40, and from about 3 to about 25.

In some embodiments, the hydrocarbon feed contains one or more hydrocarbons selected from alkanes, alkenes, arenes, and alkynes. The number of carbon atoms in the hydrocarbon chain may range from a single carbon atom (C$_1$) to a 70 carbon arrangement (C$_{70}$), including C$_1$ to C$_{20}$.

The systems and methods of the present disclosure provide various advantages over the prior art. For example, the systems and methods prevent coking of catalysts and ensure long-term steady operation. Additionally, the systems and methods may ensure near-equilibrium conversion of hydrocarbons. Operation at elevated temperatures is not required. The co-production of a high value carbon phase greatly improves economic efficiency. Additionally, the systems and methods are environmentally friendly with reduced carbon dioxide emissions. Furthermore, the reactor design may ensure high gas hourly space velocities, thereby ensuring a low capital cost.

In some embodiments, the alloy is a eutectic composition having a fixed melting point of (e.g., about −30° C.).

In some embodiments, the reactor is a column reactor with hydrocarbon bubbled through a porous (e.g., nanoporous) sparger with $O_2$ gas mixed in the feed stream to chemically modify the molten metal surface tension.

In some embodiments, the reactor includes a liner made of an oxygen donor (e.g., ceria and/or yttria-stabilized zirconia). Upon the application of an electric field between the molten metal and the vessel wall, oxide ions are transported into the liquid metal, altering its surface tension.

In some embodiments, the reactor includes vertical strings to allow a high bubble density while preventing coalescence, while simultaneously nucleating the formation of carbon particles.

The aspect ratio of the carbon particles may be controlled by the choice of catalyst and the partial pressure of hydrogen in the feed gas. The use of copper catalysts or an increased hydrogen partial pressure in the feed gas promotes the formation of graphitic planar morphologies. The use of nickel promotes the formation of higher aspect ratio carbon fibers. The aspect ratio of the carbon fibers thus formed can be controlled to within a target value by adjusting the relative loading of Ni and Cu, or by optimizing the feed gas pressure.

The carbon removal system may rely on the gravimetric separation between the particulate carbon phase and the molten metal. In some embodiments, the slurry of carbon particles in molten metal is transported to a separate settling tank and the particle free molten metal is transported back into the reaction vessel.

In some embodiments, the carbon particles form a slag layer on the molten metal within the reactor. This can be scraped away to ensure continuous removal of heavy carbon. The lighter particles carried away in the gas stream may be separated using a cyclone or electrostatic separator.

The reaction vessel may be a bubble column reactor with a modest aspect ratio (e.g., having a length:diameter ratio of less than 3). The molten metal contained in the reactor may fill no higher than 40% of the volume. The reactor may have sufficient head space (e.g., up to 20%) to accommodate ancillary units such as agitators or carbon removal scrapers and feed gas lances as required. The inside of the reactor may be lined with an oxide-conducting mixed metal oxide which provides a limited supply of oxygen to modulate the surface tension of the molten metal. The oxide layer also serves the purposed of protecting the reaction vessel from corrosion by the molten metal.

The thickness of this layer may be from about 50 μm to about 1 cm, including from about 100 μm to about 500 μm. The feed gas is sparged into the reactor at a modest partial pressure (e.g., 0.1 to 10 bar), high temperature (e.g., 600 to 1000° C.) and high space velocity that is substantially higher than the state of the art steam reforming process (GHSV greater than 3,000 $h^{-1}$).

Electric fields may be used to enhance the rate of catalytic reactions. One such example is the methane steam reforming reaction where an electric field (e.g., about 1.25 to about 1.5 eV) is applied to tune the catalyst selectivity. Here, the electric field is negative in sign and serves the purpose of providing dopant oxygen atoms to reduce the surface tension of the molten metal and enhance its catalytically active surface area. Unlike the catalyst tuning case, the applied field is oxidizing in nature. However, a positive electric field may be considered for removal of the oxide species.

In some embodiments, the catalytic hydrocracking is performed on hydrocarbons from naphtha, liquefied petroleum gas, heavy crude oil or oil sands, wood, and/or dehydrated biomass with a low oxygen content. In these implementations, the carbon-hydrogen bonds are cleaved to produce shorter carbon chain species. The hydrogen produced as a result of the cracking reaction may be used for the in-situ saturation of alkenes, alkynes and arenes to alkanes, alkenes and cycloalkanes respectively. In some embodiments where biomass or other oxygen containing organic waste is used as a feedstock, syngas and bio-oil may be non-limiting pyrolysis products in addition to carbon and hydrogen. One non-limiting potential application includes the use of the pyrolysis of cellulosic biomass such as lignin, which is a component of the waste stream produced by the pulp and paper industry.

The systems of the present disclosure may be integrated with a natural gas flare site and chemical processing to produce ammonia.

The produced hydrogen may be used at a fueling station for transportation applications, as a reactant for chemical synthesis (ammonia production, crude oil refining), or it may be converted to electricity. The solid carbon can be easily separated and sequestered far more easily than gaseous or supercritical $CO_2$, or it may be used as a manufacturing material (petroleum coke, synthetic graphite). The process is a minimum-emission (less than 0.50 kg $CO_2$ $kg^{-1}$ $H_2$), low-cost ($1.13 $kg^{-1}$ $H_2$) alternative to conventional hydrogen production processes such as steam reforming ($1.18 $kg^{-1}$ $H_2$), and could be used instead of petroleum cokers for the environmentally-friendly cracking of bituminous oil to produce synthetic crude oil, which is easier to transport.

The following examples are provided to illustrate the devices and methods of the present disclosure. The examples are merely illustrative and are not intended to limit the disclosure to the materials, conditions, or process parameters set forth therein.

EXAMPLES

Figure 3:
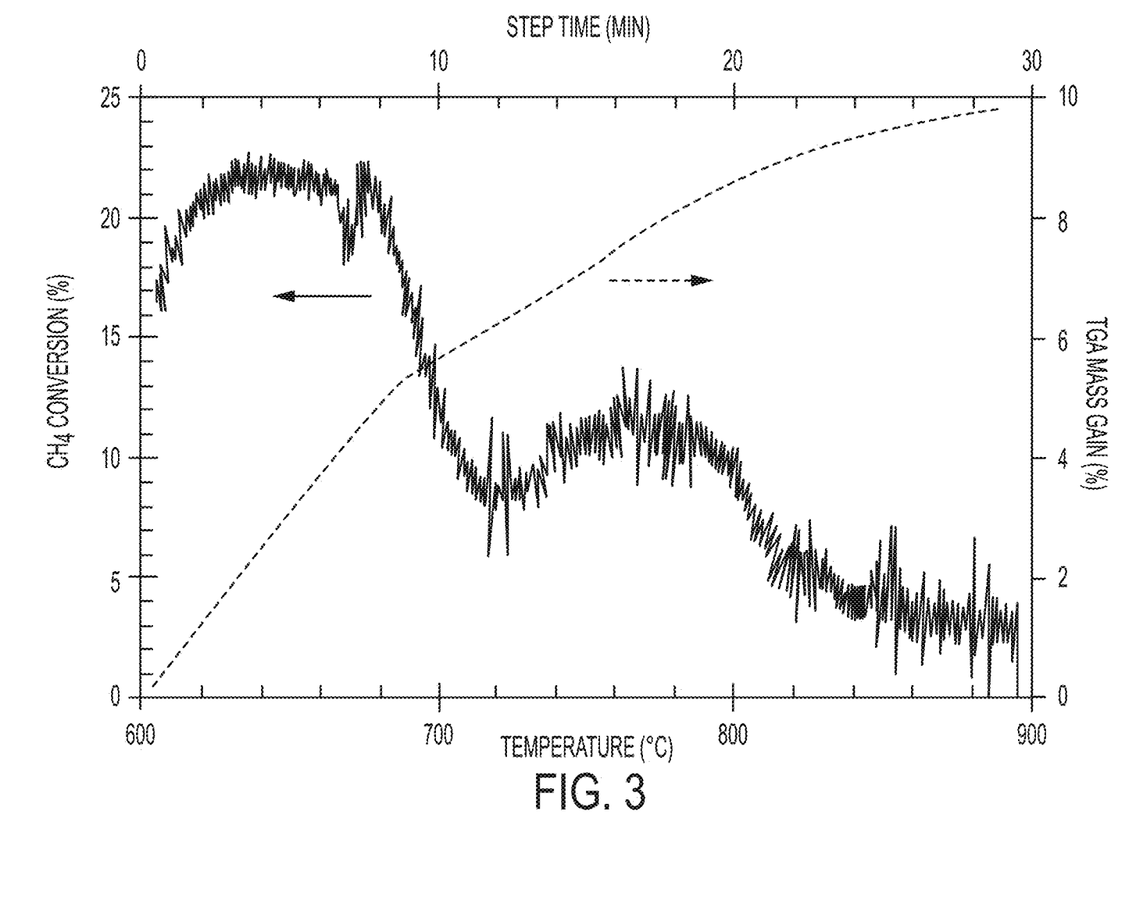
FIG. 3 is a graph showing preliminary thermo-gravimetric data for pyrolytic reforming of a methane deed in accordance with some embodiments of the present disclosure.
Figure 4:
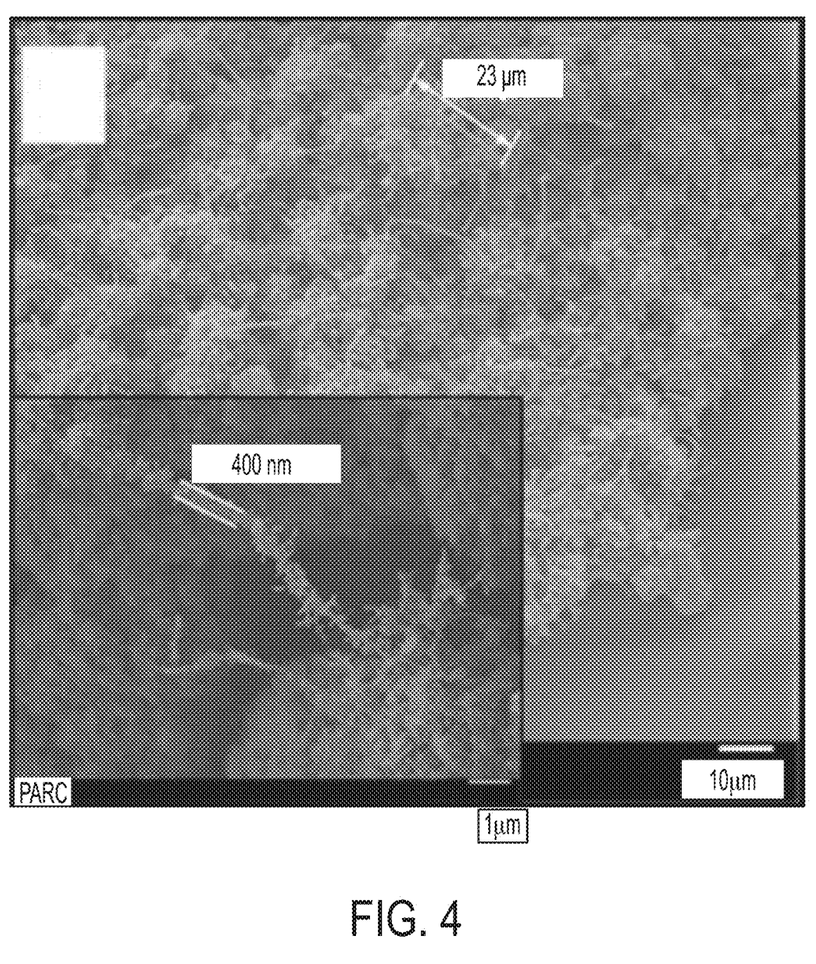
FIG. 4 is a scanning electron microscopy (SEM) micrograph showing carbon fibers that were produced as a floating slag on the surface of a molten metal in accordance with some embodiments of the present disclosure.

Differential scanning calorimetry (DSC) experiments were performed to determine the phase diagram of the Ni—Ga phase space, and demonstrate a eutectic alloy composition with a melting point of −30° C. Methane decomposition experiments were performed in a TGA using 1% methane feed to assess process feasibility by decomposing methane in the presence of the molten metal catalyst in a thermo-gravimetric analyzer, and demonstrate a maximum conversion of 22% at 635° C. corresponding to the amount of hydrocarbon that was converted to a mixture of solid carbon and gaseous hydrogen when the liquid metal was used to catalyze the decomposition of a diluted methane stream (1%). The metal surface eventually gets covered with carbon (coked), but this is not expected to be a problem in the proposed reactor design. SEM micrographs of the final product indicate that the carbon product readily separates from the molten metal and is observed as a floating slag. The carbon phase appears to primarily comprise carbon fibers with a high aspect ratio (greater than 50). FIG. 3 is a graph showing preliminary thermo-gravimetric data for pyrolytic reforming of a methane feed. FIG. 4 is a SEM micrograph showing carbon fibers that were produced as a floating slag on the surface of a molten metal.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A process for decomposing a hydrocarbon-containing composition, the process comprising:

feeding the hydrocarbon-containing composition to a reactor containing a catalytically active molten metal or a catalytically active molten metal alloy; and controlling an interfacial tension within the reactor by maintaining a dynamic equilibrium of oxide to optimize bubble surface area;

wherein the metal or alloy catalyzes a decomposition reaction of the hydrocarbon-containing composition into a hydrogen-rich gas phase and a solid carbon phase;

wherein the solid carbon phase is minimally soluble in the metal or alloy;

wherein the reactor is operated at a temperature of less than 1000° C.;

wherein the hydrocarbon-containing composition is fed to the reactor through a porous diffuser extending through a wall of the reactor; and wherein the interfacial tension is controlled by doping the hydrocarbon-containing composition with oxygen or ozone to maintain a selected degree of oxidation of the molten metal.

2. The process of claim 1, wherein the catalytically active molten metal or the catalytically active molten metal alloy comprises gallium.

3. The process of claim 1, wherein the catalytically active molten metal or the catalytically active molten metal alloy comprises bismuth.

4. The process of claim 1, wherein the catalytically active molten metal or the catalytically active molten metal alloy comprises at least one carrier element selected from the group consisting of gallium and bismuth.

5. The process of claim 1, wherein the solid carbon phase forms a floating slag in the reactor; and wherein the process further comprises removing the floating slag.

6. The process of claim 1, wherein the reactor is connected to a gravity settler or a cyclone separator.

7. The process of claim 1, wherein the solid carbon phase comprises carbon fibers, graphene, diamond, glassy carbon, high-purity graphite, carbon nanotubes, carbon black, coke, or activated charcoal.

8. The process of claim 1, wherein the alloy comprises at least one catalyst element selected from the group consisting of nickel, iron, copper, zinc and palladium.

9. The process of claim 1, wherein:

the reactor contains the catalytically active molten metal alloy and the alloy is a nickel-gallium alloy, a copper-gallium alloy, an iron-gallium alloy, or any combination thereof.

10. The process of claim 1, wherein the porous diffuser produces bubbles with a diameter in the range of from about 100 nm to about 10 mm.

11. The process of claim 1, wherein the hydrocarbon-containing composition is selected from:

the group consisting of natural gas, liquefied petroleum gas, naphtha, light crude oil, heavy crude oil, oil sands, shale oil, wood, biomass and organic waste streams; or the group consisting of straight or branched chain alkanes, alkenes, alkynes, arenes, and any combination thereof with a chain length of $C_1$ to $C_{20}$.

* * * * *